(12) United States Patent
Choi (10) Patent No.: US 7,116,648 B2
(45) Date of Patent: Oct. 3, 2006

(54) METHOD FOR IMPLEMENTING SYSTEM INFORMATION BROADCASTING FUNCTION IN ASYNCHRONOUS MOBILE COMMUNICATION SYSTEM

(75) Inventor: Yun Ju Choi, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 865 days.

(21) Appl. No.: 09/974,845

(22) Filed: Oct. 12, 2001

(65) Prior Publication Data

US 2002/0065091 A1 May 30, 2002

(30) Foreign Application Priority Data

Oct. 14, 2000 (KR) ............................. 2000-60565

(51) Int. Cl.
*H04Q 7/00* (2006.01)
(52) U.S. Cl. .................. 370/329; 370/341; 455/67.11; 455/509
(58) Field of Classification Search ................ 370/329, 370/252, 509, 216, 503, 79, 331; 455/552.1, 455/45, 434, 403
See application file for complete search history.

(56) References Cited

U.S. PATENT DOCUMENTS

| | | | | |
|---|---|---|---|---|
| 5,535,425 | A * | 7/1996 | Watanabe ................. | 455/436 |
| 5,621,732 | A * | 4/1997 | Osawa ...................... | 370/346 |
| 5,889,781 | A * | 3/1999 | Eftimakis et al. ........ | 370/509 |
| 6,064,650 | A | 5/2000 | Kappler et al. ........... | 370/232 |
| 6,374,112 | B1 * | 4/2002 | Widegren et al. ....... | 455/452.2 |
| 6,594,238 | B1 * | 7/2003 | Wallentin et al. ........ | 370/252 |
| 6,628,946 | B1 * | 9/2003 | Wiberg et al. ........... | 455/434 |
| 6,782,274 | B1 * | 8/2004 | Park et al. ............... | 455/552.1 |
| 6,795,412 | B1 * | 9/2004 | Lee .......................... | 370/329 |
| 6,847,610 | B1 * | 1/2005 | Suumaki et al. ......... | 370/230.1 |
| 6,853,852 | B1 * | 2/2005 | Park et al. ............... | 455/561 |
| 6,895,245 | B1 * | 5/2005 | Wallentin ................. | 455/436 |
| 6,909,887 | B1 * | 6/2005 | Fauconnier et al. ..... | 455/403 |

OTHER PUBLICATIONS

Lee et al. "Design and Implementation of a Wideband CDMA Democulator for an IMT-2000 System", IEEE Transaction on Consumer Electronic, vol. 46, No. 4, Nov. 2000, p. 1026-1033.*
Technical Specification, Universal Mobile Telecommunications System (UMTS); UTRAN Iub Interface NBAP Signalling (3G TS 25.433 version 3.2.0 Release 1999) ETSI TS 125 433 V3.2.0 (Jun. 2000) XP-002255548.

* cited by examiner

*Primary Examiner*—Ricky Q. Ngo
*Assistant Examiner*—Andrew C. Lee
(74) *Attorney, Agent, or Firm*—Fleshner & Kim, LLP (57) ABSTRACT

Asynchronous mobile communication system, and method for implementing a system information broadcasting function in an asynchronous mobile communication system. Upon reception of a system information renewal message from a radio network controller, a base station stores RSIMs generated by all information block segments and scheduling parameters in the message, and then calculates a first transmission time point of each of RSIMs. The base station then forms a queue of the RSIMs according to a queuing algorithm set for the RSIMs. At the end, the base station transmits the RSIM to the air when the transmission time point of a first element of the queue is the same with the current time point at every 20 ms intervals. Therefore, the processing time and the use of memory in the channel card of the base station can be optimized.

15 Claims, 5 Drawing Sheets

METHOD FOR IMPLEMENTING SYSTEM INFORMATION BROADCASTING FUNCTION IN ASYNCHRONOUS MOBILE COMMUNICATION SYSTEM

BACKGROUND OF THE INVENTION

1. Field of the Invention

The present invention relates to a method for implementing a system information broadcasting function in an asynchronous mobile communication system.

2. Background of the Related Art

The IMT-2000, a next generation mobile communication system, is required to assure global use in system design as well as system compatibility with a stationary network, and a high quality service. The IMT-2000 system is also required to assure a global roaming service, and to have an open system for easy introduction of future technologies and different applications thereto. Moreover, the IMT-2000 system is required to have a modular system to be ready for development to a more complicated system to cope with future service increases.

In general, a system information broadcasting in the asynchronous IMT-2000 system is implemented as follows.

Figure 1A:
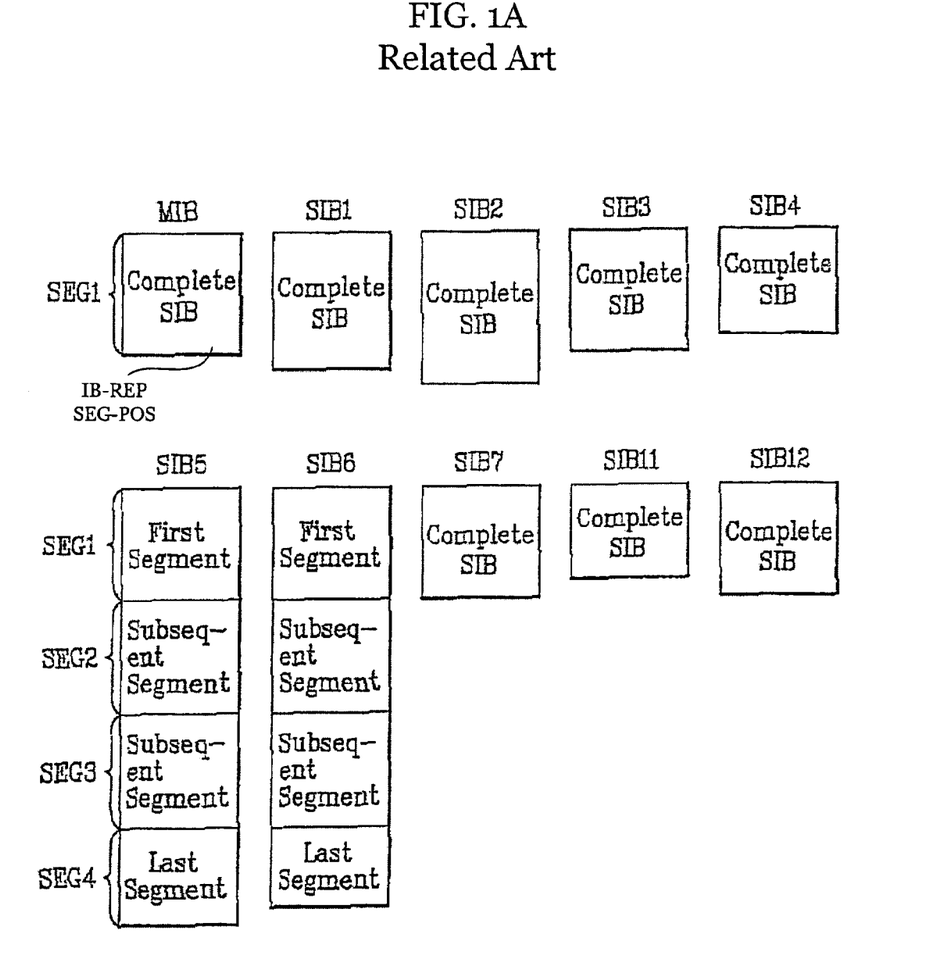
FIG. 1 illustrates a diagram showing a relation between the system information block, the IB segment, and RSIM.
Figure 1B:
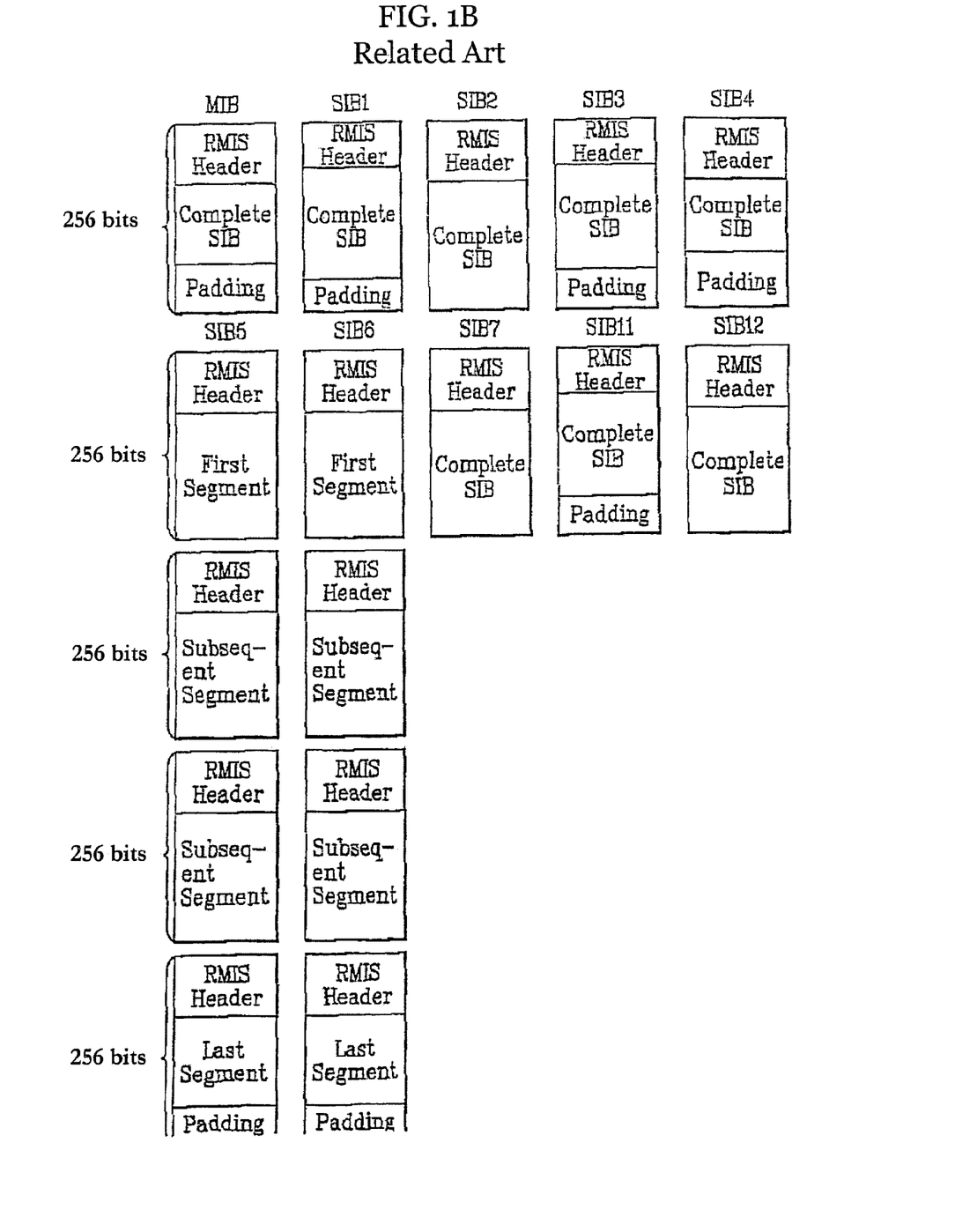

When a RNC (Radio Network Controller) transmits system information to a base station through a system information update message in NBAP (Node B Application Protocol), the base station transmits the RSIM (RRC System Information Message) generated by system information contained in the system information update message to the air repeatedly according to a scheduling parameter defined in a RRC (Radio Resource Control layer). The system information in the asynchronous IMT-2000 system has one master information block, 2 scheduling blocks, and 19 system information blocks. The information blocks represent different system information, and a user equipment reads one of the system information block depending on its own status, a waiting range, and kind of a transmission channel which belongs to a base station the system information is transmitted therefrom. The RNC segments the master information block and the system information blocks to the first segment(short), a subsequent segment, the last segment (short), and a complete IB, and transmits to the base station (MIB) and the system information blocks (SIBs) is called an information block segment (IB segment). The base station transmits one RSIM to air at 20 ms intervals through a primary common control physical channel. FIG. 1 illustrates a diagram showing a relation between the system information block and the IB segment.

Each RSIM has 256 bits. In FIG. 1, because each of RSIM generated by the master information block, a first system information block, a second system information block, a third system information block, a fourth system information block, a seventh system information block, an eleventh system information block, and a twelfth system information block has a size not exceeding a size of one BCH (Broadcasting Channel) transmission block, each of them has only one segment. On the other hand, each of RSIM generated by a fifth system information block, and a sixth system information block in FIG. 1 has a size exceeding 3 BCH transmission blocks, each of the blocks is segmented into four segments.

As parameters for fixing a scheduling time of the system information, IB_REP, and SEG_POS are included. The IB_REP is a parameter representing intervals the system information blocks are transmitted to the air, and SEG_POS is a parameter representing a location of each system information block segment within a transmission period. As a value of the IB_REP for the master information block, 8 is assigned in a frequency division duplex mode, and, as a value of the SEG_POS for the master information block, 0 is assigned in the frequency division duplex mode. Other than the master information block, the IB_REP values for the system information blocks are given differently for different system information blocks, and the SEG_POS values are given differently for different information block segments. In other words, though system information block segments in the same system information block have the same IB_REP values, the system information block segments in the same system information block have different SEG_POS values. Table 1 shows one example of the IB_REP values and the SEG_POS values. Referring to FIG. 1, it can be known that segments in the same system information block have the same IB_REP values. FIG. 1A shows MIB includes IB_REP and SEG_POS. For ease of illustration, these parameters are not shown in the SIBs.

TABLE 1

| IB | Segment | IB_REP | SEG_POS | IB | Segment | IB_REP | SEG_POS |
| --- | --- | --- | --- | --- | --- | --- | --- |
| MIB | SEG1 | 8 | 0 | SIB6 | SEG1 | 64 | 14 |
| SIB1 | SEG1 | 32 | 2 | SIB6 | SEG2 | 64 | 22 |
| SIB2 | SEG1 | 64 | 4 | SIB6 | SEG3 | 64 | 26 |
| SIB3 | SEG1 | 32 | 5 | SIB6 | SEG4 | 64 | 30 |
| SIB4 | SEG1 | 64 | 10 | SIB7 | SEG1 | 64 | 34 |
| SIB5 | SEG1 | 64 | 12 | SIB11 | SEG1 | 64 | 36 |
| SIB5 | SEG2 | 64 | 18 | SIB12 | SEG1 | 64 | 42 |
| SIB5 | SEG3 | 64 | 20 | | | | |
| SIB5 | SEG4 | 64 | 28 | | | | | through the system information update message. When the base station receives system information update message, the base station generates RSIMs using system information segment and scheduling parameter. Most of all, one RSIM is generated for one system information segment, but in some case, one RSIM consists of several system information segments. When the RSIM is smaller than 256 bits, a padding bit is added to the segment. A data unit obtained from the segmentation of the master information block The base station determines whether RSIM is transmitted to the air or not presently with reference to the IB_REP value and the SEG_POS value of the RSIM.

The base station (Node B) has an SFN counter for each cell. The SFN counter increases by 1 for every 10 ms in a count range of 0–4095 timer count. The SFN counter counts the SFN as '0' when 10 ms is passed after a time point the SFN is 4095. The following equation (1) expresses a relation of SFNtx, a time point each of the RSIMs is transmitted to the air, and the IB_REP and SEG_POS, the parameters of the RSIMs.

$$SFNtx \% SIB\_REP = SEG\_POS \quad (1),$$

That is, the base station implements scheduling of the system information block segments by a method in which the base station transmits the system information block segments to the air according to the equation (1). If there are several system information segments where are transmitted at same time, they consist of a RSIM.

The scheduling is a mechanism in which the system information block segments are transmitted to the air at different intervals by preset parameters. The equation (1) may be expressed as the following equation (2).

$$SFNtx = IB\_REP*n + SEG\_POS, (0 \leq n \leq M) \quad (2)$$

Where, the unexplained symbol 'M' represents a greatest value satisfying IB_REP*n<4096.

In summary, upon reception of the system information update message from the RNC, the base station is required to transmit respective RSIM generated by system information block segments at time points of the SFNtx values calculated by using the parameters of the IB_REP value and the SEG_POS value to the air, periodically.

By summarizing the foregoing steps, a process for implementing a system information broadcasting by the base station will be explained.

At first, upon reception of a system information update message from the RNC, the base station makes RSIM using information block segments and scheduling parameters, the base station stores all RSIMs of the master information block, scheduling block and the system information blocks, and the scheduling parameters of IB_REP and SEG_POS in a memory of the base station. Then, the base station searches the memory for a RSIM having scheduling parameters meeting the equation (1) for the SFN of the time point at every 20 ms, and transmits the RSIM to the air. The system information is information required to be transmitted always as far as the base station is in operation. Therefore, at the worst case, it is required to calculate the SFNtx for all the information block segments during the foregoing process by using the scheduling parameters at every 20 ms based on the equation (1), to require too much processing time for picking up a pertinent information block segment.

SUMMARY OF THE INVENTION

Accordingly, the present invention is directed to an asynchronous mobile communication system, and a method for implementing a system information broadcasting function in an asynchronous mobile communication system that substantially obviates one or more of the problems due to limitations and disadvantages of the related art.

An object of the present invention is to provide an asynchronous mobile communication system which can save a processing time period required for finding an information block segment, and a method for implementing a system information broadcasting function in the asynchronous mobile communication system.

Another object of the present invention is to provide an asynchronous mobile communication system which can optimize use of a memory, and a method for implementing a system information broadcasting function in the asynchronous mobile communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the base station stores RSIMs generated by information block segments from a radio network controller in a memory. Then, the base station calculates transmission time points SFNtx of the RSIM generated by information block segments to the air in advance. Then, the base station queues the stored RSIMs in an order of earliest transmission based on the calculated transmission time points with reference to the current time point. The base station compares a system frame number SFNcur, the current time point, with the transmission time point SFNtx of the RSIM to be transmitted the earliest in the queued RSIMs at every time interval (20 ms). The base station transmits the RSIM to be transmitted to the air at the earliest to the air as a result of the comparison.

In other aspect of the present invention, the base station receives a system information update message from a radio network controller, and stores all RSIMs generated by information block segments and scheduling parameters contained in the message. Then, the base station calculates transmission time points of the RSIMs to the air, and forms a queue of RSIMs based on the transmission time points of the all RSIMs according to a set queuing algorithm. Then, the base station selects a first element from the queue of the RSIMs at fixed time intervals, and transmits the RSIM to the air when the transmission time point of the RSIM, the selected element, is the same with the current time point.

Preferably, whenever one RSIM is transmitted to the air at fixed intervals, the base station calculates a next transmission time point SFNtx of the transmitted RSIM, and forms a new queue of RSIMs using a set queuing algorithm.

In another aspect of the present invention, there is provided an asynchronous mobile communication system including a first signal processing part for processing a system update message received from a radio network controller, a memory for storing RSIMs and scheduling parameters contained in the processed message, a control part for calculating transmission time points of the RSIMs to the air in advance, and forming a queue of the stored RSIMs in an order of the earliest transmission to the air based on the calculated transmission time point, a comparing part for comparing the current time point to the transmission time point of the RSIM to be transmitted at the earliest among the queue of the RSIMs at preset intervals under the control of a control signal, and a second signal processing part for processing the RSIM to be transmitted to the air according to a result of the comparison.

Preferably, whenever one RSIM is transmitted to the air at fixed intervals, the control part in the base station calculates a next transmission time point SFNtx of the transmitted RSIM, and forms a new queue of RSIMs by using a set queuing algorithm again.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 2:
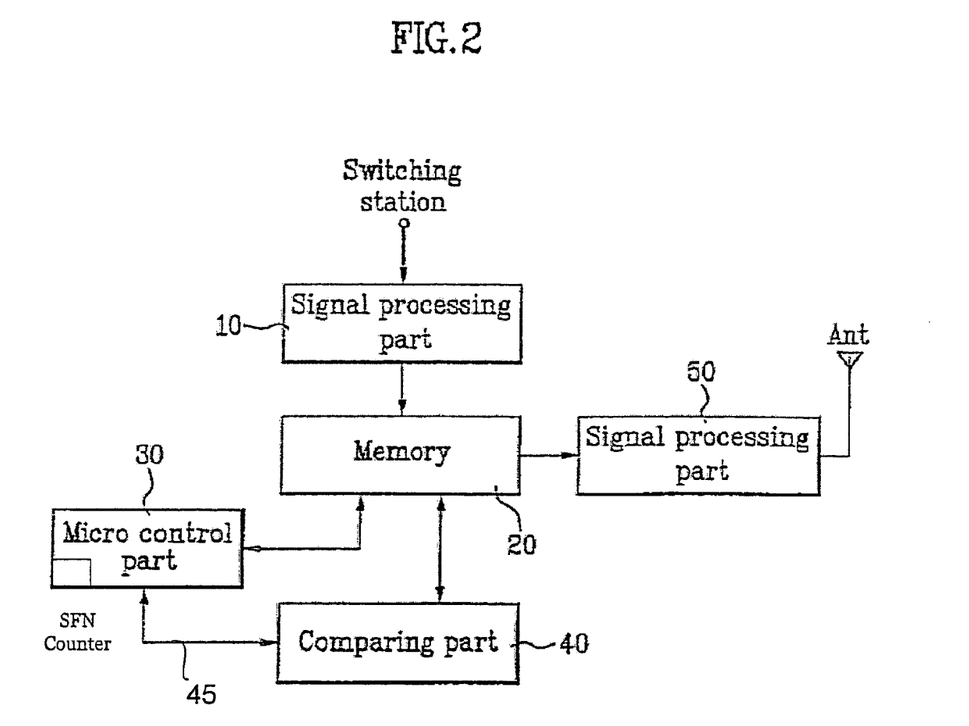
FIG. 2 illustrates a block diagram showing a system of a base station in an asynchronous mobile communication system in accordance with a preferred embodiment of the present invention.

Reference will now be made in detail to the preferred embodiments of the present invention, examples of which are illustrated in the accompanying drawings. FIG. 2 illustrates a block diagram showing a system of a base station in an asynchronous mobile communication system in accordance with a preferred embodiment of the present invention.

Referring to FIG. 2, the base station includes a first signal processing part 10, a memory 20, a micro control part 30, a comparing part 40, and a second signal processing part 50. The first signal processing part 10 processes a signal for receiving and storing of a system information update message from a RNC (not shown). The memory 20, a general memory device, stores RSIMs generated by information block segments contained in the system information update message processed at the first signal processing part 10, and schedules parameters in response to a control signal 45. The micro control part 30 calculates time points SFNtx at which the RSIM are respectively transmitted to the air in advance, and queues the stored RSIMs in an order to be transmitted to the air based on the calculated transmission time points SFNtx. That is, the micro control part 30 produces the queue of RSIMs. Moreover, the micro control part 30 provides control signals applied to other parts. The comparing part 40 compares a system frame number SFNcur of current time point to a transmission time point SFNtx of a first element in the queue of the RSIMs, i.e., the RSIM to be transmitted at the earliest at fixed time intervals (20 ms in this embodiment) in response to the control signal from the micro control part 30. As a result of the comparison, if the system frame number SFNcur of current time point is identical to the transmission time point SFNtx of a first element in the queue of the RSIMs, the micro control part 30 transfers the RSIM to the second signal processing part 50. The second signal processing part 50 makes signal processing required for transmitting the RSIM to be transmitted. When one RSIM is transmitted to the air, the micro control part 30 in the base station calculates the next transmission time point SFNtx of the transmitted information block segment, and produces a new queue of the RSIMs by using the next transmission time point SFNtx and the preset queuing algorithm again.

Figure 3:
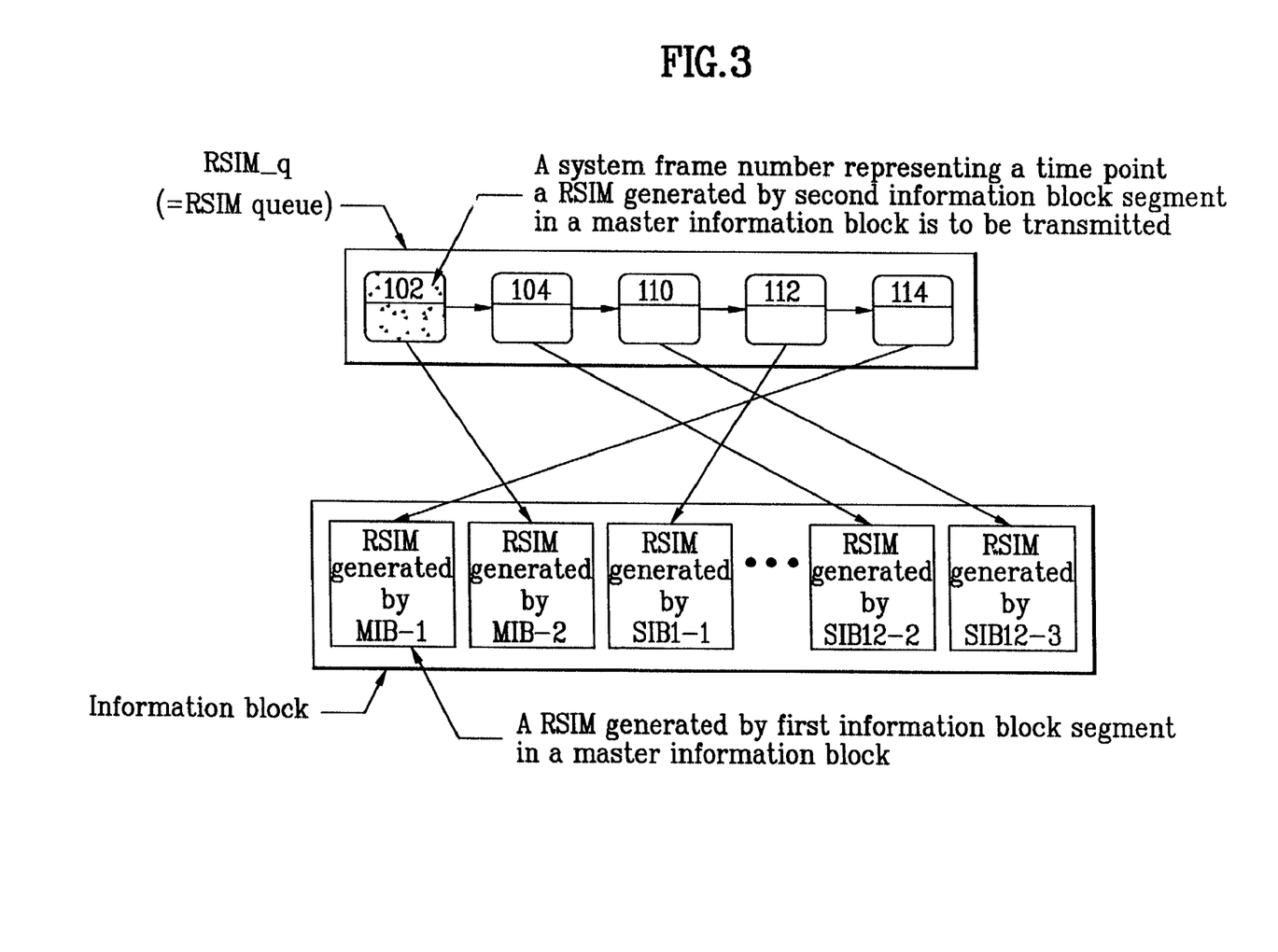
FIG. 3 illustrates a diagram showing an example of a queue of RSIMs produced according to a queuing algorithm of the present invention; and, FIG. 4 illustrates a diagram showing a queue of RSIMs produced newly as the next transmission time SFNtx is calculated after a RSIM generated by the first segment of the master information block is transmitted to the air in FIG. 3.

FIG. 3 illustrates a diagram showing an example of a queue of system RSIMs produced according to a queuing algorithm of the present invention.

Referring to FIG. 3, the queuing algorithm is a system information broadcasting algorithm for calculating the transmission time points SFNtx in advance, and queuing all RSIMs in the order of earliest transmission to the air with reference to the current time point. A process for implementing the system information broadcasting function at the base station will be explained.

Upon reception of the system information update message from a RNC, the base station stores all RSIMs generated by information block segments contained in the message and scheduling parameters. Then, the base station calculates an initial transmission time point SFNtx of respective RSIMs by applying the following equation (3).

$$tempSFNtx = \text{Round}(modify\_time \% IB\_REP)*IB\_REP+SEG\_POS \quad \text{[Equation 3]}$$

if $tempSFNtx \leq modify\_time$
then $tempSFNtx = tempSFNtx + IB\_REP$
$SFNtx = tempSFNtx \% 4096$ The transmission time point value SFNtx is calculated with reference to the modify_time, and represents a transmission time point of each of the RSIMs to be transmitted to the air. The modify_time is information contained in the system information update message from the RNC, and represents a time point at which transmission of the information block segments contained in the message to the air is initiated according to given parameters.

In the meantime, the micro control part 30 in FIG. 2 produces the queue of the RSIMs for all RSIMs generated by information block segments stored in the memory 20 by using the transmission time point value SFNtx calculated according to equation (3). The queue of the RSIMs contains addresses of the RSIMs, and first transmission time point values $SFNtx(i_{first})$ with reference to a current time point for the RSIMs.

Then, the base station takes a first element, the RSIM to be transmitted at first in view of the scheduling from the queue of the RSIMs at preset fixed time intervals (20 ms in this embodiment) with reference to the current time point. As explained, the first element contains addresses of the RSIMs, and first transmission time point values $SFNtx(i_{first})$ with reference to a current time point for the RSIMs.

In the meantime, if the SFNcur, the current time point, is identical to the transmission time point value SFNtx of the first element in the queue of the RSIMs, the micro control part 30 in the base station transfers the RSIM to the air. If the SFNcur, the current time point, is not identical to the transmission time point value SFNtx of the first element in the queue of the RSIMs, the micro control part 30 does not transfer the RSIM to the air.

In a case the RSIM is transmitted to the air, the micro control part 30 calculates the next transmission time point SFNtx of the RSIM according to the following equation (4), replaces the prior transmission time point value SFNtx with the calculated the next transmission time point value, and produces the queue of the RSIMs, newly. In other words, the micro control part 30 inserts the calculated next transmission time point value SFNtx to the RSIMs, newly.

$$SFNtx(i+1) = (SFNtx(i) + IB\_REP) \% 4096 \quad (0 \leq i \leq M-1) \quad (4)$$

Where, 'i' denotes (I)th SFNtx, and 'M' denotes a greatest value that satisfies $IB\_REP*n < 4096$.

As explained, if the SFNcur, the current time point, is not identical to the transmission time point value SFNtx of the first element in the queue of the RSIMs, the components in the FIG. 2 make no operation.

In this instance, the micro control part 30 in FIG. 2 calculates first transmission time point values $SFNtx(i_{first})$ of all RSIMs generated by information block segments contained in the received system information update request message, and calculates the next transmission time point values SFNtx(i) of the RSIM generated by the received information block segments at 20 ms intervals.

Referring to FIG. 3, the information blocks represent the RSIMs generated by the information block segments stored in the memory 20, i.e., a channel card, and elements of the queue of the RSIMs includes the RSIM, transmission time points of the RSIMs, and scheduling parameters of the RSIMs. That is, elements of the queue of the RSIMs have transmission time points SFNtx calculated according to the scheduling parameters SIB_REP values and SIB_POS values of information block segments the RSIMs designate. In the queue, the elements are always queued such that the information block segments that are required to be transmitted to the air at first are positioned in a front part of the queue.

Figure 4:
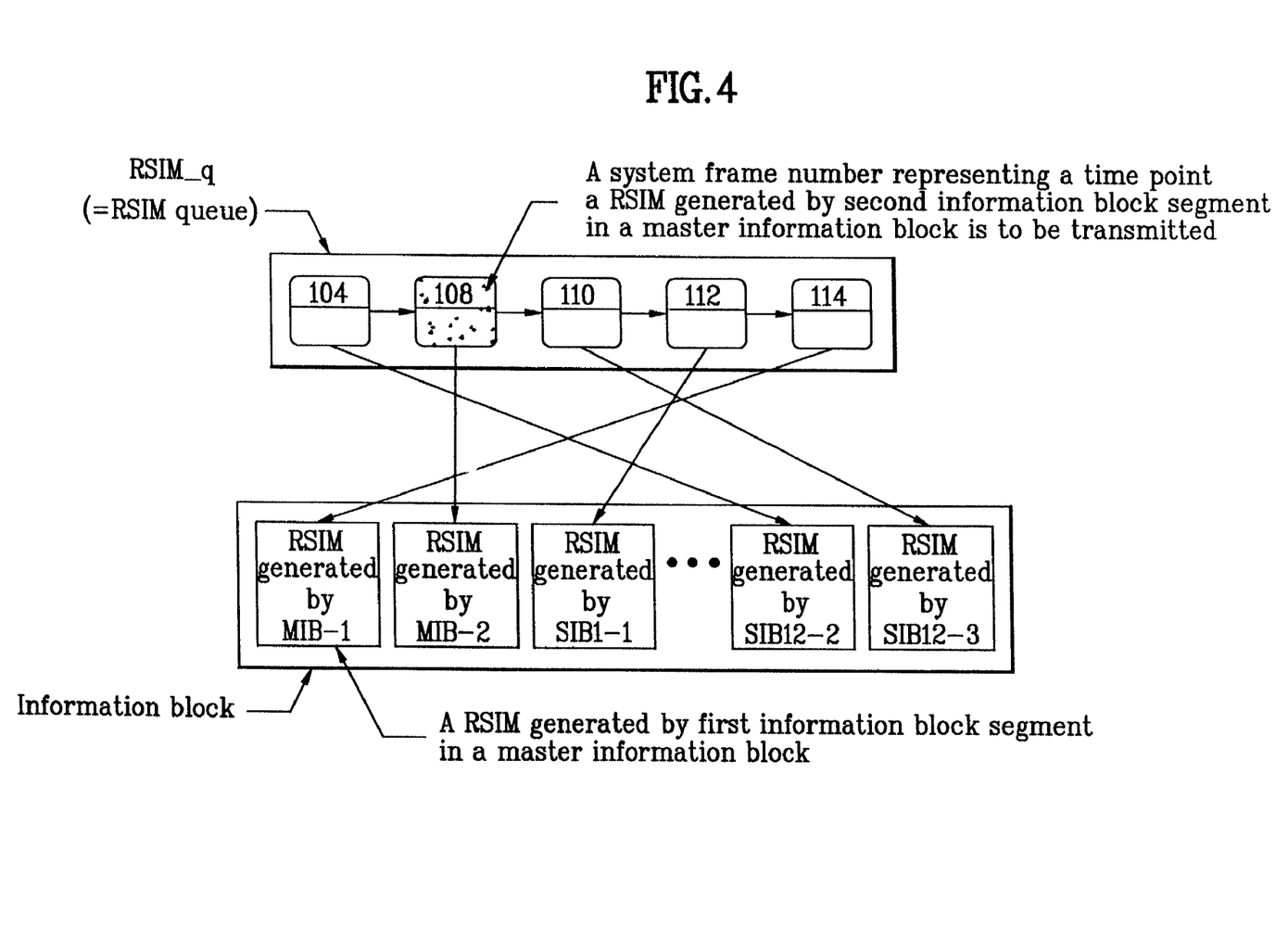

The base station stores the RSIMs generated by the information block segments in the memory (or channel card) after the system information update message is received. The stored RSIMs form the queue of the RSIMs according to the queuing algorithm at the micro control part 30. In FIG. 3, the transmission time point value SFNtx of the RSIM in the queue of the RSIMs is assumed one. It is also assumed that a time point the RSIM generated by the second block segment in the master information block is transmitted to the air is 102, and the time point the RSIM generated by the second block segment in the second system information block is transmitted to the air is 104. The current time point is assumed to be SFN=100, and it is assumed that the RSIMs queue is in an order of earliest transmission with reference to the current time point together with other RSIM generated by the information thereof. Under the foregoing assumptions, it is assumed that the preset time interval 20 ms is occurred at a moment the SFNcur value is 102, to cause to occur a timer event. When the timer event is occurred as the 20 ms is elapsed from the reference time point (SFNcur=100), the base station takes out a first queue element from the queue of the RSIMs, and compares the transmission time point SFNtx 102 of the element to the current time point SFNcur. In this instance, since the transmission time point SFNtx and the current time point SFNcur have the same values, the RSIM, the RSIM generated by the second master information block in the queue corresponding to the first queue element, is transmitted to the air through the second signal processing part 50 in FIG. 2. When the RSIM generated by the second block segment in the master information block is transmitted, the micro control part 30 calculates the next transmission time point SFNtx the RSIM generated by the second block segment in the master information block is to be transmitted by substituting 102 for SFNtx(i) in equation (4). It is assumed that the next transmission time point SFNtx the RSIM generated by the second block segment in the master information block is to be transmitted SFNtx(i+1) calculated in this time is 108 in FIG. 4. Therefore, as shown in FIG. 4, the second transmission time point SFNtx=108 is substituted for the first transmission time point SFNtx=102 within the queue. Then, the micro control part 30 forms a new queue of the RSIMs taking the transmission time points SFNtx of other RSIMs into account inclusive of the second transmission time point SFNtx=108 for the RSIM generated by the second block segment of the master information block. As explained, in the new queue of the RSIMs, since the elements, the RSIMs, are queued in the order of earliest transmission based on the transmission time points the queue in FIG. 3 is changed to the queue in FIG. 4.

FIG. 4 illustrates a diagram showing a next transmission time SFNtx is calculated after the SRIM generated by the second block segment in a master information block is transmitted at a transmission time point SFN=102, and the next transmission time SFNtx is inserted in the queue, again.

Referring to FIG. 4, the element indicating the RSIM generated by the second block segment in the master information block with reference to the transmission time point is inserted at a second time in succession to the transmission time point SFNtx=104 in the new queue. That is, the base station queues the RSIMs in the order of earliest transmission to the air after the current time point SFNcur. Basically, the transmission time points SFNtx are queued in the queue in an ascending order. However, because the RSIM, or the RSIMs each having a transmission time point greater than the current time point SFNcur are required to be transmitted before the RSIM, or the RSIMs each having a transmission time point smaller than the current time point SFNcur, the RSIM, or the RSIMs each having a transmission time point greater than the current time point SFNcur are positioned forward of the RSIM, or the RSIMs each having a transmission time point smaller than the current time point SFNcur in the queue.

As has been explained, the method for implementing a system information broadcasting function in an asynchronous mobile communication system of the present invention has the following advantages.

The base station calculates transmission time points of the RSIMs to the air in advance, and queues the RSIMs in the order of earliest transmission with reference to the current time point. Then, the base station compares the time point and the transmission time point of the RSIM to be transmitted the earliest only, to determine transmission of the RSIM at every 20 ms time interval. Therefore, since only one comparison occurs at every 20 ms, a processing time period required for carrying out the system information broadcasting function can be saved.

It will be apparent to those skilled in the art that various modifications and variations can be made in the method for implementing a system information broadcasting function in an asynchronous mobile communication system of the present invention without departing from the spirit or scope of the invention. Thus, it is intended that the present invention cover the modifications and variations of this invention provided they come within the scope of the appended claims and their equivalents.

What is claimed is:

1. A method for implementing a system information broadcasting function in an asynchronous mobile communication system, comprising:
   (a) storing Radio resource controller System Information Messages (RSIMs) generated by information block segments from a radio network controller in a memory;
   (b) calculating transmission time points of the RSIMs to the air;
   (c) queuing the stored RSIMs in an order of transmission based on the calculated transmission time points with reference to a current time point;
   (d) comparing the current time point with the transmission time point of the RSIM to be transmitted earliest in the queued RSIMs at preset time intervals; and
   (e) transmitting the RSIMs to the air if the current time point and the transmission time point of the RSIM are the same as a result of the comparison.

2. A method as claimed in claim 1, wherein the memory is a channel card.

3. A method for implementing a system information broadcasting function in an asynchronous mobile communication system, comprising:
   (a) receiving a system information renewal message from a radio network controller, and storing Radio Resource Controller System Information Messages (RSIMs) generated by information block segments and scheduling parameters contained in the message;
   (b) calculating transmission time points of the RSIMs to the air, and forming a queue of the RSIMs based on the calculated transmission time points of the RSIMs according to a set queuing algorithm;
   (c) selecting a first element from the queue of the RSIMs at fixed time intervals; and
   (d) transmitting the RSIM to the air when the transmission time point of the RSIM, the selected first element, is the same as the current time point.

4. A method as claimed in claim 3, further comprising:
   whenever one RSIM is transmitted to the air at one of the fixed time intervals, calculating a next transmission time point of the transmitted RSIM; and,
   forming a new queue of RSIMs based on the next transmission time point.

5. A method as claimed in claim 3, wherein the next transmission time point SFNtx of the RSIM is calculated according to the following algorithm:

$$SFNtx(i+1) = (SFNtx(i) + IB\_REP) \% 4096 (0 \leq i \leq M-1)$$

Where, 'i' denotes (I)th SFNtx, and 'M' denotes a greatest value that satisfies IB_REP*n<4096.

6. A method as claimed in claim 3, wherein the memory is a channel card.

7. A method as claimed in claim 3, wherein the transmission time point of the RSIMs is calculated according to the following algorithm:

$$tempSFNtx = \text{Round}(modify\_time \% IB\_REP) * IB\_REP + SEG\_POS$$

if tempSFNtx ≦ modify_time
   then tempSFNtx=tempSFNtx+IB_REP
   SFNtx=tempSFNtx % 4096
   Where, the transmission time point value SFNtx is calculated with reference to the modify_time, and represents a transmission time point each of the RSIMs is to be transmitted to the air, and the modify_time is information contained in the system information renewal message from a mobile switching center, and represents a time point at which transmission of the RSIMs contained in the message to the air is initiated according to given parameters.

8. A method as claimed in claim 3, wherein each of the elements of the queue of the RSIMs has a transmission time point calculated according to scheduling parameters of the RSIMs the element indicates.

9. A method as claimed in claim 8, wherein the parameters include:
   IB_REP representing intervals the system information blocks are transmitted to the air, and
   SEG_POS representing a location of each system information block segment within a transmission period.

10. A method as claimed in claim 3, wherein each of the elements of the queue of the RSIMs includes an address of the RSIM, and a transmission time point of the RSIM.

11. An asynchronous mobile communication system comprising:
   a first signal processing part for processing a system update message received from a radio network controller;
   a memory for storing Radio Resource Controller System Information Messages (RSIMs) generated by information block segments and scheduling parameters contained in the processed message;
   a control part for calculating transmission time points of the RSIMs to the air in advance, and forming a queue of the stored RSIMs in an order from the earliest transmission to the air based on the calculated transmission time points;
   a comparing part for comparing the current time point to the transmission time point of the RSIM to be transmitted at the earliest among the queue of the RSIMs at preset intervals under the control of a control signal; and
   a second signal processing part for processing the RSIM to be transmitted to the air according to a result of the comparison.

12. An asynchronous mobile communication system as claimed in claim 11, wherein whenever one RSIM is transmitted at fixed intervals, the control part calculates the next transmission time point of the transmitted RSIM, and forms a new queue of the RSIMs again by using a set queuing algorithm.

13. An asynchronous mobile communication system as claimed in claim 12, wherein when the next transmission time point of the transmitted RSIM is calculated, the control part inserts the next transmission time point in place of the prior transmission time point in the queue of the RSIM.

14. An asynchronous mobile communication system as claimed in claim 11, wherein the scheduling parameters stored in the memory include:
   a parameter IB_REP for representing intervals the information block segments are transmitted to the air, and
   a parameter SEG_POS for representing positions of the information block segments.

15. An asynchronous mobile communication system as claimed in claim 11, wherein the queue of the RSIMs includes addresses of the RSIMs, and the transmission time points of the RSIMs.

* * * * *